(12) United States Patent
Hunt et al.

(10) Patent No.: US 9,361,890 B2
(45) Date of Patent: Jun. 7, 2016

(54) CONTEXT-BASED AUDIO FILTER SELECTION

(71) Applicant: LENOVO (Singapore) PTE, LTD., New Tech Park (SG)

(72) Inventors: John Miles Hunt, Raliegh, NC (US); John Weldon Nicholson, Cary, NC (US)

(73) Assignee: Lenovo (Singapore) PTE. LTD., New Tech Park (SG)

( * ) Notice: Subject to any disclaimer, the term of this patent is extended or adjusted under 35 U.S.C. 154(b) by 173 days.

(21) Appl. No.: 14/032,973

(22) Filed: Sep. 20, 2013

(65) Prior Publication Data

US 2015/0088512 A1    Mar. 26, 2015

(51) Int. Cl.
*G10L 17/00* (2013.01)
*G10L 21/0208* (2013.01)

(52) U.S. Cl.
CPC ............. *G10L 17/00* (2013.01); *G10L 21/0208* (2013.01)

(58) Field of Classification Search
None
See application file for complete search history.

(56) References Cited

U.S. PATENT DOCUMENTS

| 6,523,001 | B1 * | 2/2003 | Chase | 704/10 |
| 2005/0149320 | A1 * | 7/2005 | Kajala et al. | 704/206 |
| 2007/0150268 | A1 * | 6/2007 | Acero et al. | 704/226 |
| 2008/0065386 | A1 * | 3/2008 | Cross et al. | 704/270 |

FOREIGN PATENT DOCUMENTS

EP    1089526    * 4/2001

* cited by examiner

*Primary Examiner* — Jeremiah Bryar
(74) *Attorney, Agent, or Firm* — Kunzler Law Group

(57) ABSTRACT

For context-based audio filter selection, a type module determines a recipient type for a recipient process of an audio signal. The recipient type includes a human destination recipient type and a speech recognition recipient type. A filter module selects an audio filter in response to the recipient type.

17 Claims, 7 Drawing Sheets

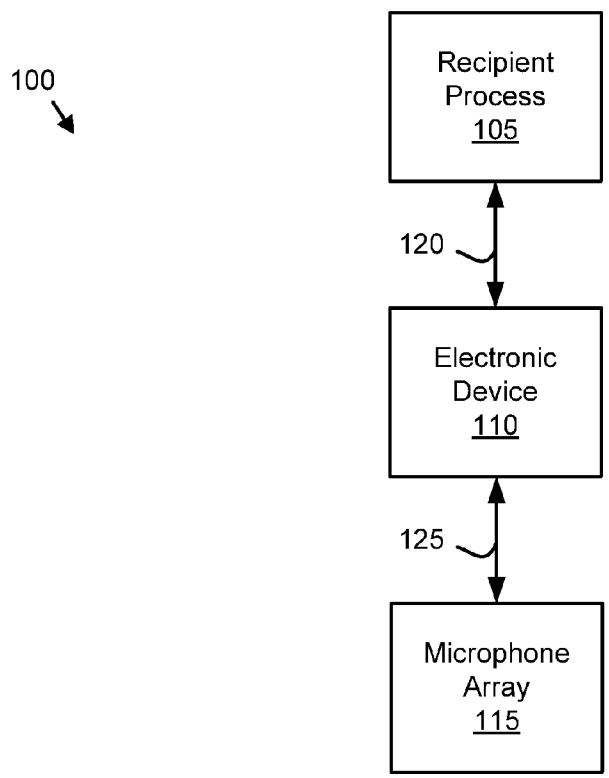
FIG. 1
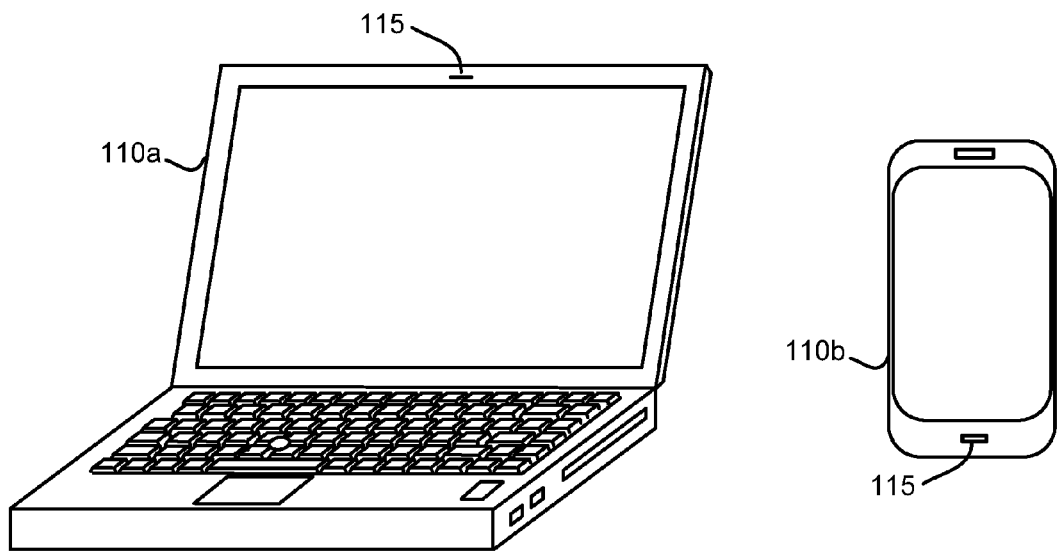
FIG. 2A
FIG. 2B

145

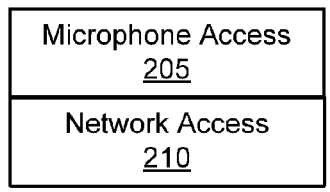

| Microphone Access |
| 205 |
| Network Access |
| 210 |

| Recipient Process ID 220 | Recipient Type 270 | Audio Filter ID 225 |
|---|---|---|
| Network Telephone ID 230 | Human Destination RT 275 | Beamforming Filter ID 235 |
| Speech to Text ID 240 | Speech Recognition RT 280 | Diction Filter ID 245 |
| Texting ID 250 | Mixed Use RT 255 | Mixed Use Filter ID 256 |
| GUI ID 260 | Speech Recognition RT 280 | Diction Filter ID 245 |
|  | Human Destination RT 275 | Beamforming Filter ID 235 |
|  | Speech Recognition RT 280 | Diction Filter ID 245 |
|  | Mixed Use RT 255 | Mixed Use Filter ID 256 |

CONTEXT-BASED AUDIO FILTER SELECTION

BACKGROUND

1. Field

The subject matter disclosed herein relates to audio filter selection and more particularly relates to context-based audio filter selection.

2. Description of the Related Art

Electronic devices often apply audio filters to audio signals before communicating the audio signals to a recipient process. Unfortunately, different recipient processes work better with different audio filters.

BRIEF SUMMARY

An apparatus for context-based audio filter selection is disclosed. The apparatus includes a microphone array, a processor, and a memory. The memory stores computer readable code executable by the processor. The computer readable code includes a type module and a filter module. The type module determines a recipient type for a recipient process of an audio signal from a microphone array. The recipient type includes a human destination recipient type and a speech recognition recipient type. The filter module selects an audio filter in response to the recipient type. A method and computer program product also perform the functions of the apparatus.

BRIEF DESCRIPTION OF THE DRAWINGS

A more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which:

FIG. 1 is a schematic block diagram illustrating one embodiment of audio processing;

FIGS. 2A-B are perspective drawings illustrating embodiments of electronic devices;

FIG. 5 is a schematic block diagram illustrating one embodiment of permissions;

FIG. 6 is a schematic block diagram illustrating one embodiment of a profile mapping;

DETAILED DESCRIPTION

Figure 3:
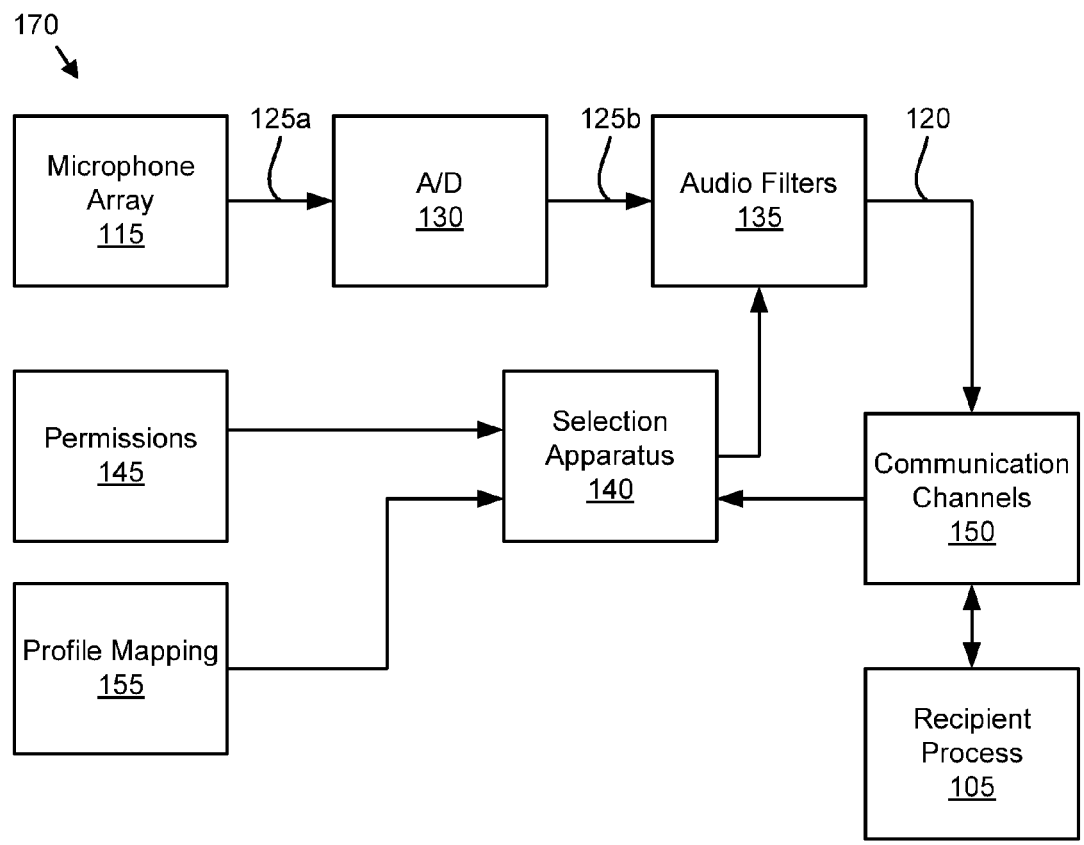
FIG. 3 is a schematic block diagram illustrating one alternate embodiment of audio processing.

As will be appreciated by one skilled in the art, aspects of the embodiments may be embodied as a system, method or program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a program product embodied in one or more computer readable storage devices storing computer readable code. The storage devices may be tangible, non-transitory, and/or non-transmission.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in computer readable code and/or software for execution by various types of processors. An identified module of computer readable code may, for instance, comprise one or more physical or logical blocks of executable code which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of computer readable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different computer readable storage devices, and may exist, at least partially, merely as electronic signals on a system or network. Where a module or portions of a module are implemented in software, the software portions are stored on one or more computer readable storage devices.

Any combination of one or more computer readable medium may be utilized. The computer readable medium may be a computer readable signal medium or a computer readable storage medium. The computer readable storage medium may be a storage device storing the computer readable code. The storage device may be, for example, but not limited to, an electronic, magnetic, optical, electromagnetic, infrared, holographic, micromechanical, or semiconductor system, apparatus, or device, or any suitable combination of the foregoing.

More specific examples (a non-exhaustive list) of the storage device would include the following: an electrical connection having one or more wires, a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable code embodied therein, for example, in baseband or as part of a carrier wave. Such a propagated signal may take any of a variety of forms, including, but not limited to, electro-magnetic, optical, or any suitable combination thereof. A computer readable signal medium may be any storage device that is not a computer readable storage medium and that can communicate, propagate, or transport a program for use by or in connection with an instruction execution system, apparatus, or device. Computer readable code embodied on a storage device may be transmitted using any appropriate medium, including but not limited to wireless, wire line, optical fiber cable, Radio Frequency (RF), etc., or any suitable combination of the foregoing.

Computer readable code for carrying out operations for embodiments may be written in any combination of one or more programming languages, including an object oriented programming language such as Java, Smalltalk, C++ or the like and conventional procedural programming languages, such as the "C" programming language or similar programming languages. The computer readable code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to," unless expressly specified otherwise. An enumerated listing of items does not imply that any or all of the items are mutually exclusive, unless expressly specified otherwise. The terms "a," "an," and "the" also refer to "one or more" unless expressly specified otherwise.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of the embodiments are described below with reference to schematic flowchart diagrams and/or schematic block diagrams of methods, apparatuses, systems, and program products according to embodiments. It will be understood that each block of the schematic flowchart diagrams and/or schematic block diagrams, and combinations of blocks in the schematic flowchart diagrams and/or schematic block diagrams, can be implemented by computer readable code. These computer readable code may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams block or blocks.

The computer readable code may also be stored in a storage device that can direct a computer, other programmable data processing apparatus, or other devices to function in a particular manner, such that the instructions stored in the storage device produce an article of manufacture including instructions which implement the function/act specified in the schematic flowchart diagrams and/or schematic block diagrams block or blocks.

The computer readable code may also be loaded onto a computer, other programmable data processing apparatus, or other devices to cause a series of operational steps to be performed on the computer, other programmable apparatus or other devices to produce a computer implemented process such that the program code which execute on the computer or other programmable apparatus provide processes for implementing the functions/acts specified in the flowchart and/or block diagram block or blocks.

The schematic flowchart diagrams and/or schematic block diagrams in the Figures illustrate the architecture, functionality, and operation of possible implementations of apparatuses, systems, methods and program products according to various embodiments. In this regard, each block in the schematic flowchart diagrams and/or schematic block diagrams may represent a module, segment, or portion of code, which comprises one or more executable instructions of the program code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and computer readable code.

Descriptions of Figures may refer to elements described in previous Figures, like numbers referring to like elements.

FIG. 1 is a schematic block diagram illustrating one embodiment of audio processing 100. The audio processing 100 is performed by a microphone array 115, an electronic device 110, and a recipient process 105. The microphone array 115 may receive audible signals. The microphone array 115 converts the audible signals into audio signals 125. The audio signals 125 may be analog electrical signals. Alternatively, the audio signals 125 may be digital signal values.

The electronic device 110 may filter the audio signals 125. For example, electronic device 110 may filter the audio signals 125 to improve the signal-to-noise ratio of the audio signals 125. In addition, the electronic device 110 may communicate the filtered audio signals 120 to the recipient process 105. The recipient process 105 may be a communication process, a speech recognition process, or the like.

Unfortunately, different recipient processes 105 work better with audio signals 125 that have been filtered with different audio filters. For example, a recipient process 105 that provides the filtered audio signal 120 to a human listener may perform better with filtered audio signals 120 that have been filtered with a beamforming filter. However, a recipient process 105 that interprets human speech, such as a speech recognition program, may work better with filtered audio signals 120 that have been filtered with a diction filter.

The embodiments described herein determine a recipient type for the recipient process 105 and select an audio filter in response to the recipient type as will be described hereafter. As a result, the electronic device 110 employs a more compatible audio filter to the audio signals 125 so the filtered audio signals 120 are more effectively processed by the recipient process 105. Therefore, if the recipient process 105 is a human destination recipient type, the embodiments select an audio filter compatible with the human destination recipient type such as a beamforming filter. In addition, if the recipient process 105 is a speech recognition recipient type, the embodiments select an audio filter compatible with the speech recognition recipient type such as a diction filter.

FIGS. 2A-B are perspective drawings illustrating embodiments of electronic devices 110. FIG. 2A depicts a laptop computer electronic device 110a. FIG. 2B depicts a mobile telephone electronic device 110b. One of skill in the art will recognize that other electronic devices 110 may be employed, including but not limited to tablet computers, eyeglass computers, wearable computers, computer workstations, and the like. The laptop computer electronic device 110a and a mobile telephone electronic device 110b each include a microphone array 115.

Each electronic device 110 may receive audible signals at the microphone array 115 and communicate audio signals 125 to a recipient process 105 such as a speech recognition program or a communication program generating audible signals for a human listener.

FIG. 3 is a schematic block diagram illustrating one alternate embodiment of audio processing 170. The audio processing 170 is performed by elements including but not limited to the microphone array 115, an analog-to-digital converter 130, audio filters 135, permissions 145, a profile mapping 155, a selection apparatus 140, communication channels 150, and the recipient process 105.

The microphone array 115 receives audible signals and communicates analog audio signals 125a to the analog-to-digital converter 130. The analog to digital converter 130 converts the analog audio signals 125a to digital signal value audio signals 125b. The audio filters 135 filter the digital signal value audio signal 125b to generate filtered audio signals 120. The filtered audio signals 120 are then communicated over the communication channels 150 to one or more recipient processes 105.

The communication channels 150 may be internal to the electronic device 110. For example, the communication channels 150 may include an internal bus. Alternatively, the communication channels 150 may be a memory or buffer that stores the digital signal values. In addition, the communication channels 150 may include external communication channels such as the Internet, a Wi-Fi network, a mobile telephone network, a local area network, a wide-area network, or combinations thereof.

The selection apparatus 140 may gather information from the permissions 145, the profile mapping 155, and the communication channels 150 to select the audio filter of the audio filters 135 that will be applied to the digital signal value audio signals 125b as will be described hereafter.

Figure 4:
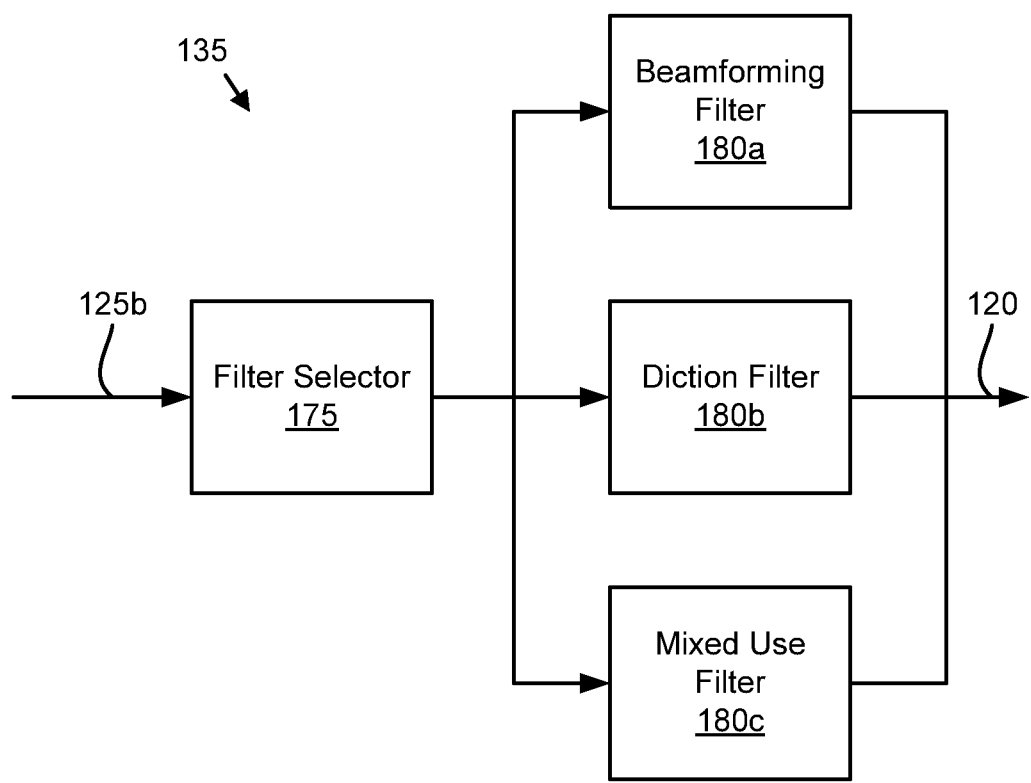
FIG. 4 is a schematic block diagram illustrating one embodiment of audio filters.

FIG. 4 is a schematic block diagram illustrating one embodiment of the audio filters 135. In the depicted embodiment, the audio filters 135 include a filter selector 175, a beamforming filter 180a, a diction filter 180b, and a mixed-use filter 180c. The filter selector 175 employs one of the beamforming filter 180a, diction filter 180b, or mixed-use filter 180c to filter the digital signal value audio signals 125b and generate the filtered digital signals 120.

FIG. 5 is a schematic block diagram illustrating one embodiment of permissions 145. The permissions 145 may be maintained for each recipient process 105. The permissions 145 include but are not limited to a microphone access 205 and the network access 210.

The microphone access 205 may indicate whether the recipient process 105 can access the microphone array 115. The network access 210 may indicate whether the recipient process 105 is permitted to access an external communication channel 150 such as the Internet and/or a mobile telephone network. The network access 210 may specify each external communication channel 150 that the recipient process 105 is permitted to access.

The embodiments may determine the recipient type for the recipient process 105 if the microphone access 205 indicates that the recipient process 105 is permitted to access the microphone array 115. In addition, the embodiments may determine the recipient type for the recipient process 105 if the microphone access 205 indicates of the recipient process 105 is permitted to access the microphone array 115 and the network access 210 indicates that the recipient process 105 may access an external communication channel 150. Thus the embodiments would determine the recipient type for an Internet telephone process or an Internet speech recognition process if the processes were permitted to access the microphone array 115 and the external communication channels 150.

FIG. 6 is a schematic block diagram illustrating one embodiment of a profile mapping 155. The profile mapping 155 may be structured in a table, a database, a flat file, links data structures, or the like. The profile mapping 115 may be stored in a memory. In the depicted embodiment, the profile mapping 115 includes a plurality of entries 223. Each entry 223 may include recipient one or more of a process identifier 220, a recipient type 270, and an audio filter 225.

The recipient process identifier 220 identifies the recipient process 105. The recipient type 270 specifies a recipient type including but not limited to a human destination recipient type 275, a speech recognition recipient type 280, or a mixed-use recipient type 255 for the recipient process 105. In addition, the audio filter identifier 225 specifies an audio filter 180 for use with the recipient type 270 and/or the recipient process identifier 220. The beamforming filter identifier 235 may identify the beamforming filter 180a, the diction filter identifier 245 may identify the diction filter 180b, and the mixed-use filter identifier 256 may identify the mixed-use filter 180c.

Entries 223e-g do not specify a recipient process identifier 220. The profile mapping 155 may also associate recipient processes 105 that are not identified, but for which the recipient type 270 is determined, with audio filter identifiers 225.

For example, in entry 223e the human destination recipient type 275 is associated with the beamforming filter identifier 235, in entry 223f the speech recognition recipient type 280 is associated with the diction filter identifier 245, and in entry 223g the mixed-use recipient type 255 is associated with the mixed-use filter identifier 256.

Figure 7:
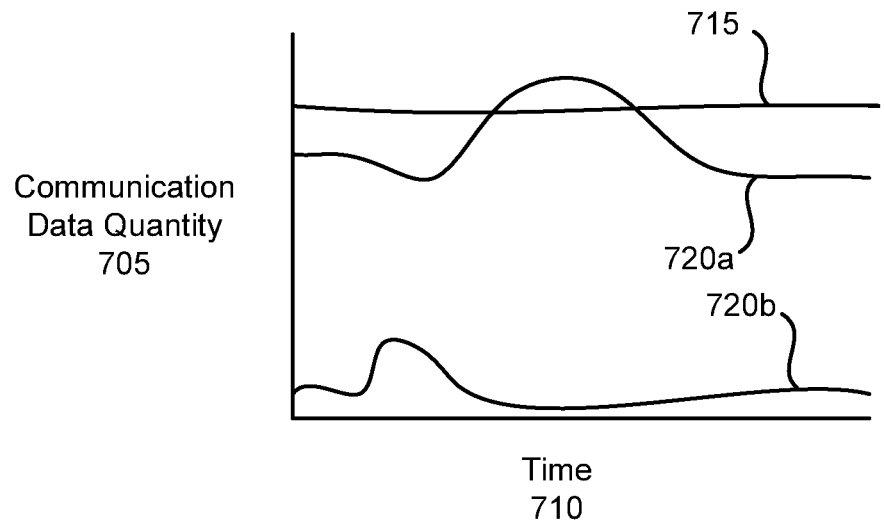
FIG. 7 is a graph illustrating embodiments of communication data.

FIG. 7 is a graph illustrating one embodiment of communication data 715, 720. The graph shows quantities of data communicated from and received at the communication channels 150 over time, with the communication data quantity 705 on the vertical axis and time 710 on the horizontal axis. A data quantity communicated 715 is depicted as having a high communication data quantity 705. The high communication data quantity 705 may be indicative of communicating audio data.

In addition, two data quantities received 720 are also shown. A first data quantity received 720a depicts relatively high communication data quantities 705 while a second data quantity received 720b depicts relatively low communication data quantities 705. The first data quantity received 720a may be exemplary of audio data such as from an Internet telephone recipient process 105. The second data quantity received 720b may be exemplary of text data such as from a speech recognition recipient process 105.

Figure 8:
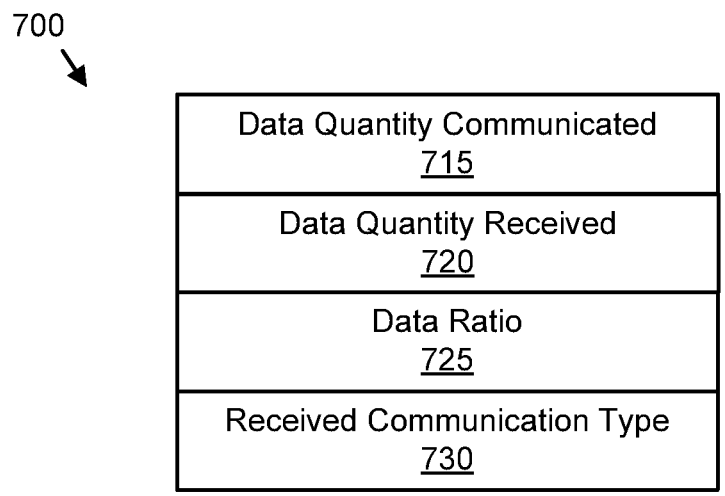
FIG. 8 is a schematic block diagram illustrating one embodiment of communication data.

FIG. 8 is a schematic block diagram illustrating one embodiment of communication data 700. In one embodiment, the communication data 700 is organized for each recipient process 105. The communication data 700 may be structured in a database, a flat file, linked data structures, or the like, and may be stored in a memory.

The communication data 700 includes the data quantity communicated 715 and the data quantity received 720 for the recipient process 105. In one embodiment, the data quantity communicated 715 and the data quantity received 720 are stored for a plurality of specified times 710. Alternatively, the data quantity communicated 715 and the data quantity received 720 are sums of data quantity over a specified time interval such as 1 to 10 seconds.

The data ratio 725 may be calculated as the data quantity communicated 715 divided by the data quantity received 720. In one embodiment, the data quantity communicated 715 at each specified time 710 is divided by the data quantity received 720 at the specified time 710, and the data ratio 725 is calculated as an average of the results. Alternatively, the sum of the data quantity communicated 715 may be divided by the sum of the data quantity received 720 to calculate the data ratio 725.

The communication data 700 further includes a received communication type 730. The received communication type 730 may specify whether the communication from the recipient process 105 is an audio communication. The received communication type 730 may specify that the communication from the recipient process 105 is audio communication in response to the communication including session initiation protocol (SIP) traffic from the recipient process 105.

Figure 9:
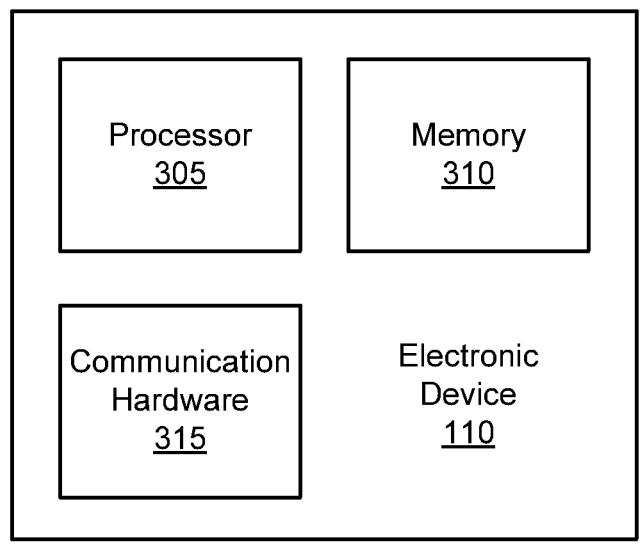
FIG. 9 is a schematic block diagram illustrating one embodiment of an electronic device.

FIG. 9 is a schematic block diagram illustrating one embodiment of the electronic device 110. The electronic device 110 includes a processor 305, a memory 310, and communication hardware 315. The memory 310 may include semiconductor storage devices, hard disk drives, optical storage devices, micromechanical storage devices, or combinations thereof. The memory 310 may store computer readable code. The processor 305 may execute the computer readable code. The communication hardware 315 may communicate with other devices. For example, the communication hardware 315 may communicate with an external communication channel 150.

Figure 10:
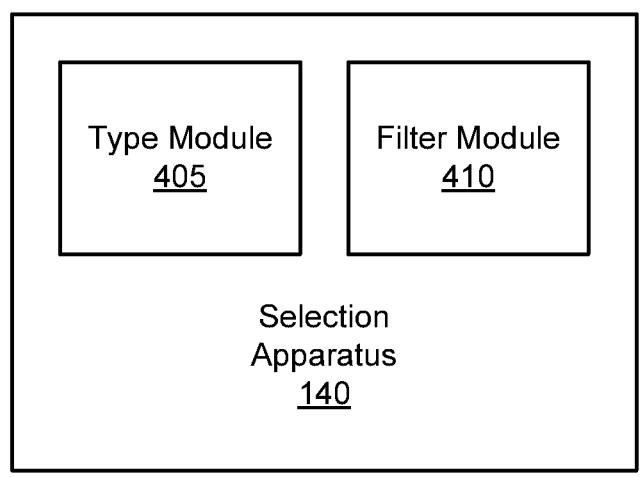
FIG. 10 is a schematic block diagram illustrating one embodiment of a selection apparatus.

FIG. 10 is a schematic block diagram illustrating one embodiment of a selection apparatus 140. The apparatus 140 may be embodied in the electronic device 110. The apparatus 140 includes a type module 405 and a filter module 410. The type module 405 and the filter module 410 may be embodied in a computer readable storage medium such as the memory 310. The computer readable storage medium may store computer readable code that performs the functions of the type module 405 and the filter module 410 when executed by the processor 305.

The type module 405 determines a recipient type 270 for a recipient process 105 of an audio signal 125. The recipient type 270 may be the human destination recipient type 275 or the speech recognition recipient type 280. In a certain embodiment, the recipient type 270 may also be the mixed-use recipient type 255. The filter module 410 may select an audio filter 180 in response to the recipient type 270 as will be described in more detail hereafter.

Figure 11:
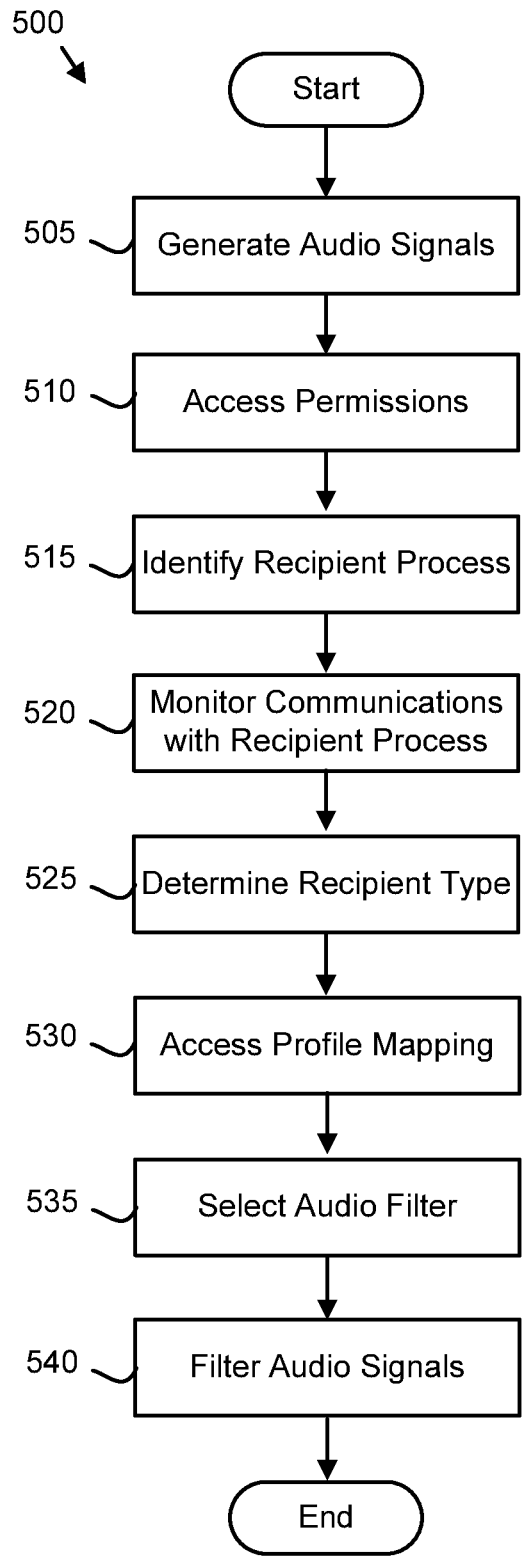
FIG. 11 is a schematic flow chart diagram illustrating one embodiment of an audio filter selection method.

FIG. 11 is a schematic flow chart diagram illustrating one embodiment of an audio filter selection method 500. The method 500 may perform the functions of the electronic device 110 and the apparatus 140. The method may be performed by the processor 305. Alternatively, the method may be performed by a program product. The program product may include a computer readable storage medium such as the memory 310 that stores computer readable code. The processor 305 may execute the computer readable code to perform the method 500.

The method 500 starts, and in one embodiment the microphone array 115 generates 505 audio signals 125. The microphone array 115 may generate the audio signals from audible signals.

The type module 405 may further access 510 the permissions 145. For example, the type module 405 may determine which recipient processes 105 have microphone access 205 and network access 210.

In addition, the type module 405 may identify 515 one or more recipient processes 105 that receive the audio signals 125 through the communication channels 150. In one embodiment, the type module 405 may examine packets that carry the audio signals 125 to identify 515 the recipient processes 105. Alternatively, the type module 405 may examine a registry or process list to identify 510 the recipient processes 105.

In one embodiment, the type module 405 identifies 515 the recipient process 105 in response to permissions 140 for the recipient process 105. For example, the type module 405 may identify 515 each process with microphone access 205 and network access 210.

In one embodiment, the type module 405 monitors 520 communications with the recipient processes 105. The type module 405 may monitor 520 the data quantity communicated 715 to a recipient process 105 and the data quantity received 720 from the recipient process 105. In addition, the type module 405 may parse packets that carry the audio signals 125 in order to determine a destination address, a communication protocol, and the like.

In one embodiment, the type module 405 determines 525 a recipient type 270 for the recipient process 105 of the audio signal 125. The type module 405 may determine 525 that the recipient type 270 is the speech recognition recipient type 280 in response to the data ratio 725 of the data quantity communicated 715 to the recipient process 105 to the data quantity received 720 from the recipient process 105 exceeding a data ratio range.

The data ratio range may be between 0.75 and 1.25. Alternatively, the data ratio range may be between 0.5 and 1.5. The type module 405 may determine 525 that the recipient type 270 is the human destination recipient type 275 in response to the data ratio 725 being within the data ratio range. For example, if the data ratio 725 is 1.1, the type module 405 may determine 525 that the recipient type 270 is the human destination recipient type 275.

Alternatively, the type module 405 may determine 525 that the recipient type 270 is the speech recognition recipient type 280 in response to the data ratio 725 exceeding the data ratio range. For example, if the data ratio 725 is 3.3, the type module 405 may determine 525 that the recipient type 270 is the speech recognition recipient type 280.

The type module 405 may determine 525 that the recipient type 270 is the human destination recipient type 280 in response to receiving an audio communication from the recipient process 105. For example, if the type module 405 monitored 520 audio communications from the recipient process 105, the type module 405 may determine 525 that the recipient type 270 is the human destination recipient type 275. The type module 405 may detect the audio communication in response to SIP traffic from the recipient process 105.

In one embodiment, the type module 405 determines 525 the recipient type 270 from the profile mapping 155. For example, the recipient process identifier 220 of the recipient process 105 may be associated with a recipient type 270 in the profile mapping 155. The type module 405 may use the recipient process identifier 220 for the recipient process 105 to access the recipient type 270 corresponding to the recipient process identifier 220.

The filter module 410 may further access 530 the profile mapping 155 using the recipient type 270 to identify an audio filter identifier 225 corresponding to the recipient type 270. In one embodiment, the filter module 410 accesses 530 the profile mapping 155 using the recipient process identifier 220 of the recipient process 105 to identify the audio filter identifier 225 corresponding to the recipient process 105.

The filter module 410 may select 535 the audio filter 180 identified by the audio filter identifier 225 corresponding to the recipient type 270. In one embodiment, the beamforming filter 180a is selected in response to the human destination recipient type 275. Alternatively, the diction filter 180b may be selected in response to the speech recognition type recipient type 280. In a certain embodiment, the mixed-use filter 180c may be selected if the type module 405 is unable to determine the recipient type 270 or determines that the recipient type 270 is the mixed use recipient type 255.

The audio filter 135 may use the selected audio filter 180 to filter 540 the audio signals 125 and the method 500 ends. By determining the recipient type 270 for the recipient process 105 of the audio signal 125, the most appropriate and/or effective audio filter 180 for the recipient process 105 may be selected. As a result, speech recognition recipient processes 105 receive audio signals 125 filtered 540 with appropriate filters 180 such as diction filters 180b while human destination recipient processes 105 receive filtered audio signals 120 filtered 540 with appropriate filters 180 such as beamforming filters 180a. Thus, both the speech recognition recipient processes 105 and the human destination recipient processes 105 receive filtered audio signals 120 best suited to their respective functions.

Embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An apparatus comprising:
 a microphone array;
 a processor;
 a memory storing computer readable code executable by the processor, the computer readable code comprising:
 a type module that determines if a recipient process of an audio signal from the microphone array is a speech recognition recipient type else that determines if the recipient process is a human destination recipient type;
 a filter module that selects a diction audio filter in response to determining the speech recognition recipient type.

2. The apparatus of claim 1, wherein a recipient type is determined to be the speech recognition recipient type in response to a data ratio of a data quantity communicated to the recipient process to a data quantity received from the recipient process exceeding a data ratio range and the recipient type is determined to be the human destination recipient type in response to the data ratio being within the data ratio range.

3. The apparatus of claim 1, wherein a recipient type is determined to be the human destination recipient type in response to receiving an audio communication from the recipient process.

4. The apparatus of claim 3, wherein the audio communication from the recipient process is detected in response to session initiation protocol (SIP) traffic from the recipient process.

5. The apparatus of claim 1, wherein the recipient process is associated with a recipient type in a profile mapping.

6. The apparatus of claim 1, wherein the filter module selects a beamforming filter in response to determining the human destination recipient type.

7. A method comprising:
 determining, by use of a processor, if a recipient process of an audio signal is a speech recognition recipient else determining if the recipient process is a human destination recipient type; and
 selecting a diction audio filter in response to determining the speech recognition recipient type.

8. The method of claim 7, wherein a recipient type is determined to be the speech recognition recipient type in response to a data ratio of a data quantity communicated to the recipient process to a data quantity received from the recipient process exceeding a data ratio range and the recipient type is determined to be the human destination recipient type in response to the data ratio being within the data ratio range.

9. The method of claim 7, wherein a recipient type is determined to be the human destination recipient type in response to receiving an audio communication from the recipient process.

10. The method of claim 9, wherein the audio communication from the recipient process is detected in response to session initiation protocol (SIP) traffic from the recipient process.

11. The method of claim 7, further comprising identifying the recipient process in response to permissions for the recipient process.

12. The method of claim 7, wherein the recipient process is associated with the recipient type in a profile mapping.

13. The method of claim 7, wherein a beamforming filter is selected in response to determining the human destination recipient type.

14. A program product comprising a non-transitory computer readable storage medium storing computer readable code executable by a processor to perform:

determining if a recipient process of an audio signal is a speech recognition recipient type else determining if the recipient process is a human destination recipient type; and selecting a diction audio filter in response to determining the speech recognition recipient type.

15. The program product of claim 14, wherein a recipient type is determined to be the speech recognition recipient type in response to a data ratio of a data quantity communicated to the recipient process to a data quantity received from the recipient process exceeding a data ratio range and the recipient type is determined to be the human destination recipient type in response to the data ratio being within the data ratio range.

16. The program product of claim 14, wherein a recipient type is determined to be the human destination recipient type in response to receiving an audio communication from the recipient process.

17. The program product of claim 16, wherein the audio communication from the recipient process is detected in response to session initiation protocol (SIP) traffic from the recipient process.

\* \* \* \* \*